Patented Aug. 3, 1943

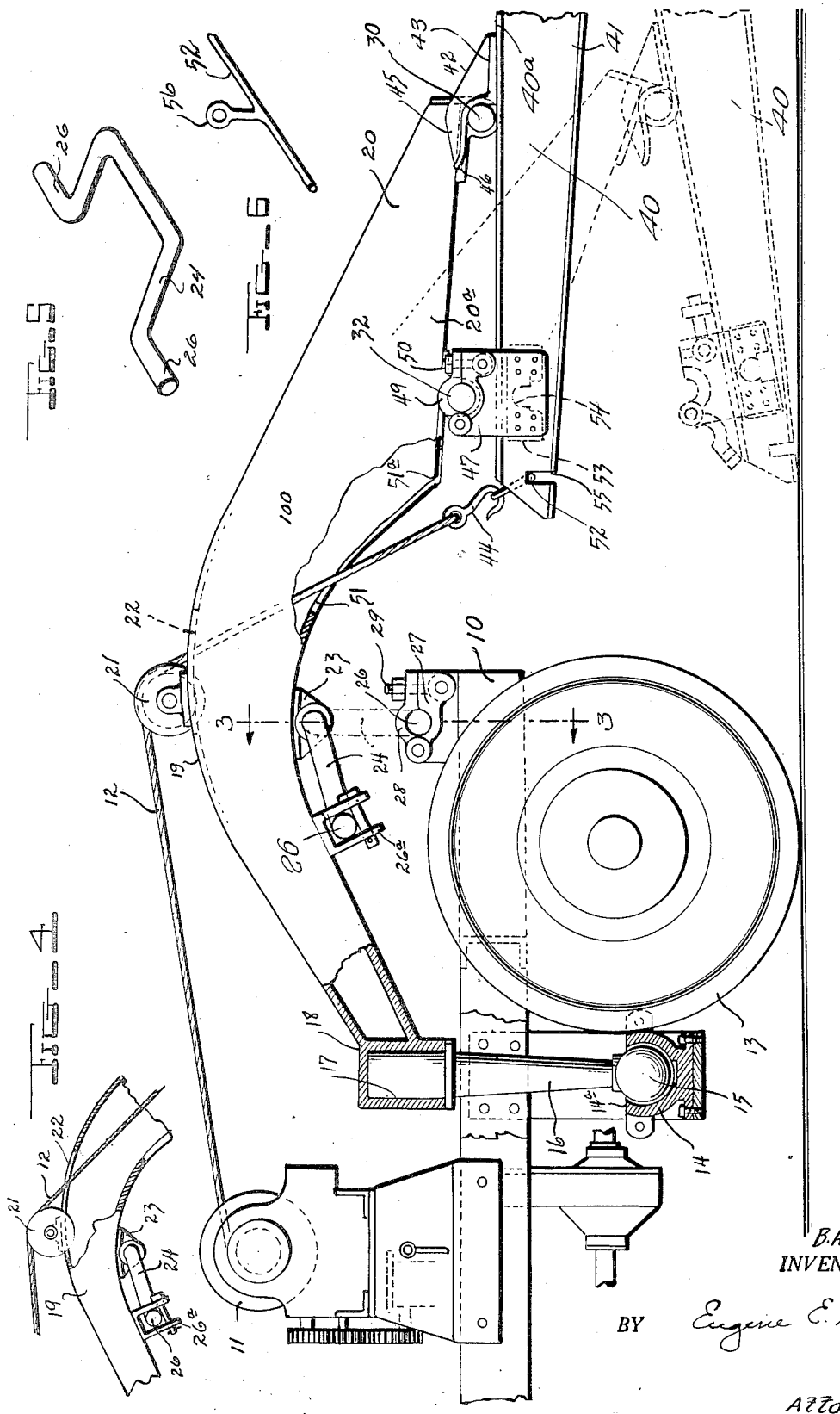

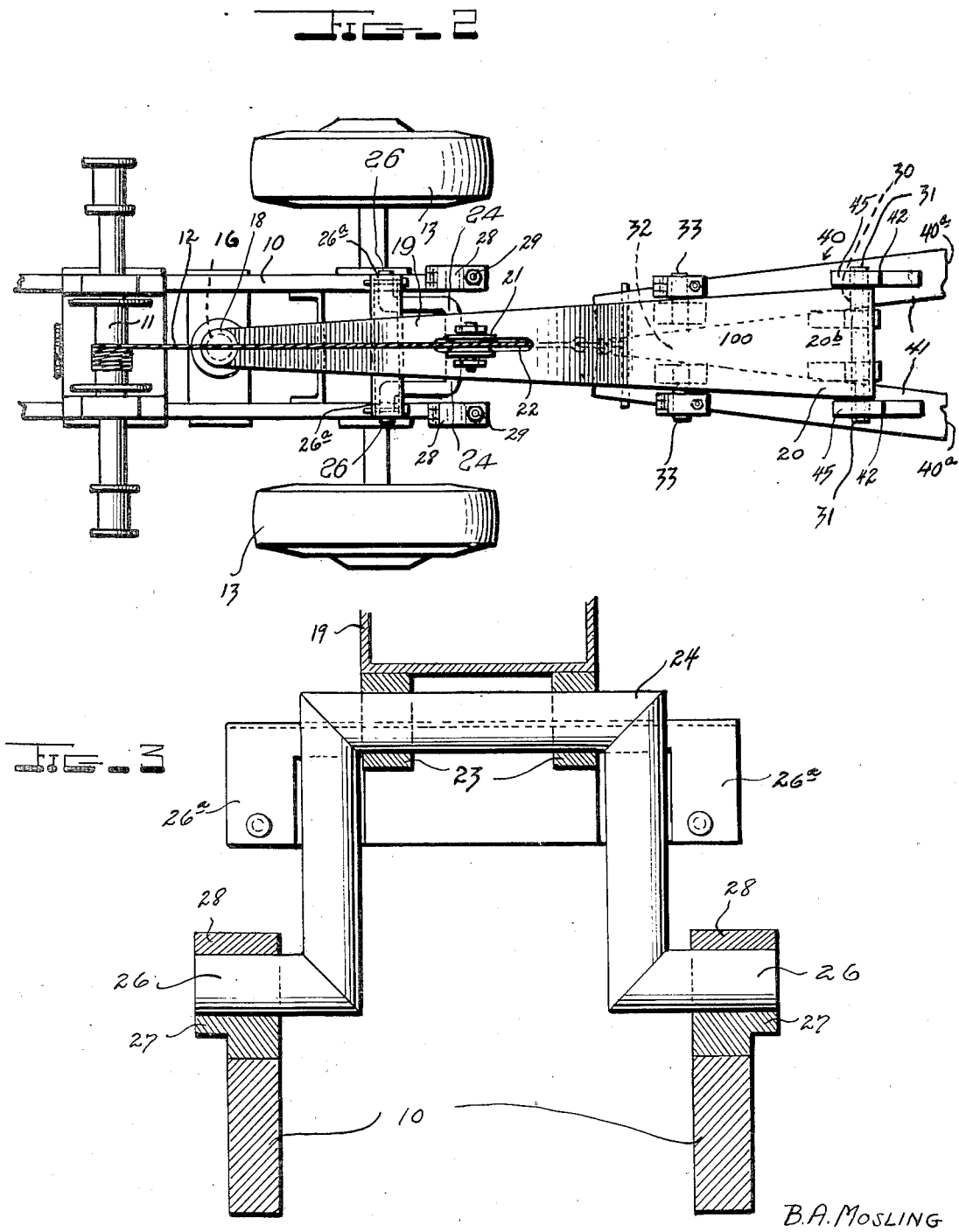

2,325,869

UNITED STATES PATENT OFFICE 2,325,869

APPARATUS FOR COUPLING TRACTORS TO TRAILERS

Bernhard A. Mosling, Oshkosh, Wis.

Application July 10, 1940, Serial No. 344,797

22 Claims. (Cl. 280—33.2)

My invention relates to apparatus for coupling tractors to trailers and has particular reference to couplings for that type of trailer which has a tongue or trail to which the tractor is connected. A device is particularly adapted to couple a tractor to the trail of a field gun but is, of course, applicable to other types of trailers.

With the foregoing in view, an object of my invention is to provide an improved coupling for a tractor and trailer;

A further object is to provide such a coupling wherein the trailer has a tongue or trail to which the tractor is hitched with a minimum of lost time and wherein a preliminary coupling is accomplished merely by backing the tractor into an engaging contact with portions of said tongue or trail, a final coupling being thereafter accomplished.

A further object is to provide such a coupling wherein a gooseneck or crane member on the tractor is preliminarily coupled to a tongue or trail of the trailer by backing the tractor to cause substantially horizontal sliding engagement of a portion of said crane member with a cooperative portion of said tongue or trail and wherein a secondary or final coupling is thereafter made between other portions of said crane and tongue.

A further object is to provide such a coupling as last described wherein slight misalignments of tractor and trailer are automatically compensated for during said secondary coupling.

A further object is to provide in a tractor novel crane means for coupling the same to a tractor and including means for rigidly attaching said crane means to a trailer while providing a swingable connection between said crane means and said tractor.

A further object is to provide in a crane means such as that last described, means for connecting said crane to said tractor to prevent swinging movement of the crane at certain times.

A further object is to provide novel combinations of tractor carried coupling means with complementary trailer carried coupling means.

A further object is to provide novel combinations of tractor carried coupling means with complementary trailer carried coupling means and including coupling means comprising interengaging rigid means carried by both tractor and trailer together with a second rigid means carried by one of said tractor and trailer and adapted to be engaged by a movable clamp means carried by the other of said tractor or trailer.

A further object is to provide in a combination such as that last described, means carried by said tractor and operative to move said trailer to a position to permit the engagement of said clamp means.

Other objects and advantages reside in the particular structure of my coupling, combination and arrangement of the several parts thereof and in the particular mode of operation, as will be readily apparent to those skilled in the art upon reference to the attached drawings, together with the following detailed description and appended claims.

In the drawings:

Fig. 1 is a fragmentary side elevational view partly in section, of a tractor and trailer and showing my improved coupling;

Fig. 2 is a plan view of Fig. 1;

Fig. 3 is a fragmentary section on the line 3—3 of Fig. 1 but showing certain parts in a different position;

Fig. 4 is a fragmentary elevation, with parts in vertical section, of a detail;

Fig. 5 is a perspective of a detail; and

Fig. 6 is a perspective of a detail.

Referring specifically to the drawings, wherein like reference characters have been used throughout to designate like parts, 10 designates the frame of any suitable tractor member having a drum 11 mounted thereon around which is wound a cable 12. Any suitable source of power for actuating the drum may be provided, such as a connection with the motor of the tractor (not shown). A socket member 14 is mounted low down in the central portion of the frame 10 forwardly of the rear wheels 13 and seated in said socket 14 is the ball end 15 of an upright member 16. Suitable cap means 14a retain the ball end 15 in the socket 14 for universal movement therein. The upper end of the upright 16 is rigidly connected as at 17 to an end 18 of a gooseneck or crane member 100 which includes an upwardly directed humped portion 19 and a depending free end 20. A sheave 21 is suitably mounted on the humped portion 19 of the crane 100 and a downwardly directed aperture 22 is formed through said humped portion 19 rearwardly of the sheave 21. The cable 12 passes over the sheave 21 and downwardly through the aperture 22 for a purpose to be described later.

The underside of the humped portion 19 is provided with one or more bearings 23 which swingably mount the bight portion of a substantially U-shaped brace member 24. The free ends 26 of the legs of the member 24 are bent into axial alignment and the member 24 may be retained in an inoperative position along the underside of the crane 100 by suitable clips or the like 26a which are connected to the crane 100 and which detachably engage the free ends 26 of the member 24. When the brace member 24 is put in use, the free ends of the legs are detached from the clips 26a and the member 24 is swung downwardly to a substantially vertical position with the free ends 26 thereof seated in rigid socket members 27 fixed on an upper rear portion of the tractor frame 10. The member 24 is held in the operative position by swingable clamps 28 which are swung over the free ends 26 and secured to the socket member 27 by any suitable means 29. Obviously, this arrangement could be reversed and the brace 24 could be pivoted to the frame 10 instead of to the gooseneck 100.

As is apparent from the foregoing, the crane or gooseneck 100 is swingably connected to the tractor frame 10 for universal movement in the socket 14 when the brace member 24 is in the inoperative position but this flexible connection becomes rigid as far as lateral swinging movement is concerned when the brace member 24 is clamped to the tractor frame 10 by the clamp and socket 28, 27. The purpose of this arrangement will be apparent later.

In the form of embodiment illustrated, the trailer comprises a field gun having a trail, or tongue, 40 comprising laterally and downwardly converging trail members 41. Each member 41 has a top flange 40a which mounts a rigid coupling member or keeper 42 on its upper surface. Each keeper 42 includes a base portion 43 which is attached to the flange 40a by suitable means and a rearwardly directed, upwardly offset coupling portion 45 which overlies the upper surface of the trail, or tongue, flange 40a in spaced relation thereto. The under surface of the free rear edge of the coupling portion 45 may be beveled as at 46 to facilitate the coupling of the gooseneck 100 thereto.

Further coupling members, comprising sockets 47 are suitably fixed by suitable means on the upper surfaces of the trail flange 40a rearwardly of the couplings 42, each socket 47 includes a clamp 49 swingably connected thereto and suitable means 50 are provided to rigidly connect the free ends of the clamp 49 to the sockets 47. The trail members 41 are detachably connected together in the region of their free ends by any suitable means (not shown).

The free end 20 of the crane or gooseneck 100 is outwardly flared in both plan and side elevation to provide a dove-tail top 20b and flared sides 20a. The sides 20a are spanned by bars 30 and 32 which are rigidly attached thereto and which extend traversely thereof adjacent the rear and front corners respectively thereof. The free ends 31 and 33 of the bars 30 and 32 respectively extend outwardly of the sides 20a and are adapted to be seated respectively beneath the coupling portions 45 of the keepers 42 and in the sockets 47 of the clamps 49.

On the inner surfaces of the trail members 41 adjacent the free ends thereof are a pair of plates 53 providing opposed slots 54 which are open at the bottoms and which are closed at the tops. The plates 53 are conventional on many guns and are secured to the trail members 41 in any suitable manner and the two slots 54 are directly opposite each other. Obviously, the plates 53 can be omitted and the slots 54 formed directly in the trail member 41 if desired. The free end of the cable 12 is provided with a bar 52 which is secured thereto in any suitable manner and which may be of a length to seat in the opposed slots 54 of the trail members 41. Or, as shown, the bar 52 may be seated in the notches 55 which are formed in each trail piece 41 and which are conventional in many guns. A hook 44 on the cable engages in eye 56 of the bar 52. Obviously, the hook 44 and bar 52 are but examples of a number of ways of connecting the cable to the trail.

When the tractor is in use without the trailer, the cable 12 is reeled in until the rod 52 on the end thereof seats under the humped portion 19 of the gooseneck 100 and raises the same until the brace 24 can be swung downwardly to permit the free ends 25 of the legs thereof to seat in the sockets 27. The clamps 28 are now swung to position and the fastening means 29 secured. The gooseneck 100 cannot now be swung back and forth in a lateral plane as the tractor moves along.

To permit the extension of the cable the gooseneck and underside thereof is provided with a slot 51 which may be extended a short distance as at 51a into the floor of the flared end of the gooseneck.

In operation, the brace 24 of the gooseneck 100 is placed in the inoperative position, thereby permitting the free lateral swinging of the gooseneck and the cable 12 is slacked to permit the rearmost edge of the gooseneck to drop down to a position close to the ground. The tractor is then backed up to the trail, or tongue, of the gun until the free ends 31 of the bar 30 slide under the overhanging portion 45 of the keepers 42. The cable 12 is now slacked again and the bar 52 on the free end of the cable is seated in the slots 54 or 55. The cable drum 11 is now rotated to hoist the trail into the full line position of Fig. 1. This movement automatically swings the trail the amount necessary to align the gooseneck and the trail properly and seat the free ends 33 of the second bar 32 in the sockets 47 of the trail. The clamps 49 are now swung into place and the fastening means 50 secured. The coupling is now complete. It is to be noted that the cable 12 prevents sagging of the gooseneck and the trail while the universal joint 14, 15 permits swinging movement of the tractor and gun for turns. At the same time the gooseneck and trail are rigidly connected together. To disconnect the coupling, the above procedure is reversed.

The foregoing manner of achieving the coupling is equally applicable to any form of trailer which has a forwardly extending tongue and is not, of course, limited to field guns. However, when used with field guns, it has an additional important feature. In most field guns the trail members 41 are hinged at the gun end so that they may be swung laterally from the rearwardly converging position shown to a rearwardly diverging position which is the firing position. In large caliber guns it requires considerable effort to bring the trail members together when the gun is to be moved. However, with my device the hook 44, cable 12 and drum 11 can be used to swing the trail pieces together without undue effort or loss of time. To do this, the hook is simply hooked on to one trail member 41 at any convenient point and the cable is reeled in, the other trail member is then treated likewise and both trail members are thereby brought together quickly.

From the foregoing, it is apparent that I have provided couplings which require a minimum number of parts to be added to a conventional trail or tongue, thereby permitting the latter to be adapted to use with my goosenecks with but little change and at slight expense. At the same time, the coupling is one which can be quickly attached and detached from the trailer but which provides a rigid connection with the gooseneck, together with great flexibility for turning. While I have shown and described what is now thought to be the preferred embodiment of my invention, it is understood that the same is susceptible of other forms and expressions and that I do not limit myself therefore to the specific structure shown and described except as hereinafter claimed.

I claim:

1. A coupling adapted for connecting a tractor and a trailer, comprising a gooseneck universally connected to said tractor and having a free end extending rearwardly thereof, a readily detachable coupling between the free end of said gooseneck and said trailer, said coupling comprising coupling means on said free end of said gooseneck, and complementary coupling means on said trailer for rigidly connecting said trailer to said gooseneck.

2. A coupling adapted for connecting a tractor and a trailer, comprising a gooseneck, a universal connection between one end of said gooseneck and said tractor, a free end of said gooseneck extending rearwardly of said tractor, a plurality of separate complementary coupling means on the trailer and the said free end of said gooseneck, at least one of said complementary coupling means comprising rigid interengaging members adapted to be coupled automatically by being slidingly engaged by relative and substantially horizontal movement of said tractor and trailer towards each other.

3. A coupling adapted for connecting a tractor and a trailer, comprising a gooseneck, means connecting one end of said gooseneck to said tractor for universal swinging movement, complementary coupling means on said gooseneck and trailer for rigidly connecting the same together, and means for locking said gooseneck to said tractor to prevent swinging movement of said gooseneck through a substantially horizontal plane when disconnected from a trailer.

4. A coupling adapted for connecting a tractor and a trailer, comprising a gooseneck, means connecting one end of said gooseneck to said tractor for universal swinging movement, complementary coupling means on said gooseneck and trailer for rigidly connecting the same together, said coupling means including rigid complementary means adapted to be coupled automatically by being substantially horizontally slidingly engaged, and a separate clamp means adapted to supplement said rigid coupling and maintain said rigid coupling coupled.

5. A coupling adapted for connecting a tractor and a trailer, comprising a gooseneck universally connected to said tractor and having a free end extending rearwardly thereof, complementary coupling means on said trailer and on the free end of said gooseneck, said complementary coupling means being engageable for rigidly connecting said trailer to said gooseneck, and means for raising and lowering said gooseneck to position and maintain said free end thereof at a predetermined height.

6. A coupling adapted for connecting a tractor and a trailer, comprising a gooseneck universally connected to said tractor and having a free end extending rearwardly thereof, complementary coupling means on said trailer and on the free end of said gooseneck, said complementary coupling means being engageable for rigidly connecting said trailer to said gooseneck, and means for raising and lowering said gooseneck to position and maintain said free end thereof at a predetermined height, and said last named means including a portion adapted to be coupled to said trailer to supplement said first named coupling means.

7. A coupling adapted for connecting a tractor and trailer, comprising a gooseneck member universally connected to said tractor and having a free end extending rearwardly thereof, said trailer having a vertically swingable tongue member, a keeper on one of said members, a bar on said other member and adapted for a substantially horizontal sliding engagement with said keeper, a swingable clamp on one of said members, a second bar on the other of said members and adapted to be engaged by said clamp, flexible means for raising and lowering said gooseneck member and including means adapted to engage said tongue member to maintain the same at a predetermined height.

8. The structure of claim 7, and means on said tractor for locking said gooseneck against swinging movement in a substantially lateral plane.

9. A coupling adapted for connecting a tractor and trailer, comprising a gooseneck member universally connected to said tractor and having a free end extending rearwardly thereof, said trailer having a vertically swingable tongue member, a keeper on one of said members, a bar on said other member and adapted for a substantially horizontal sliding engagement with said keeper, a swingable clamp on one of said members, a second bar on the other said members and adapted to be engaged by said clamp, flexible means for raising and lowering said gooseneck member to bring said keeper and first bar into alignment for sliding engagement, means for thereafter connecting said flexible member to said tongue member to raise the same to position said clamp and second bar for engagement, said flexible member thereafter supporting both said gooseneck member and tongue member at a predetermined height.

10. The structure of claim 9, and at least one of said bars being on said gooseneck member.

11. The structure of claim 9, a brace member associated with said gooseneck, means swingably mounting said brace for movement into and out of a position connecting said gooseneck to said tractor to prevent lateral swinging of said gooseneck, and means locking said brace member in said last named position.

12. A coupling adapted for connecting a tractor and a trailer such as a field gun having a trail formed by a pair of downwardly and rearwardly converging trail members, said tractor having rear wheels, said coupling comprising a gooseneck, means universally connecting one end of said gooseneck to said tractor forwardly of said rear wheels, flexible means for raising and lowering said gooseneck, a free end of said gooseneck extending rearwardly of said tractor, coupling means on the free end of said gooseneck, opposed sockets in the inner sides of said trail members, complementary coupling means on said trail for engaging said coupling means on said gooseneck, and means carried by said flexible means and adapted to be seated in said sockets to permit raising of said trail to a predetermined height.

13. The structure of claim 12, said coupling means on said trail and gooseneck including portions substantially horizontally slidably engageable upon relative movement of said tractor and field gun towards each other.

14. A coupling adapted for connecting a tractor and a field gun or the like having a rearwardly and downwardly directed trail, comprising a coupling member mounted for vertical swinging movement on said tractor, complementary rigid coupling means on said trail and member, and said coupling means being interengageable and being so constructed and arranged as to be automatically guided into interengagement by backing said tractor over said trail to bring said coupling member into engagement therewith below the coupling means thereon, said coupling member being adapted to slide up said trail upon continued backing of said tractor to cause said coupling means to interengage.

15. The structure of claim 14, said coupling means comprising transversely aligned rearwardly directed keepers on said trail and a transverse bar carried by said member and engageable in said keepers, and means for maintaining said bar in said keepers.

16. The structure of claim 3, said means for locking said gooseneck against swinging movement comprising a brace member movable from an inoperative position to an operative position, and means for coupling said gooseneck and tractor together through said brace member when said brace member is in the operative position.

17. The structure of claim 3, said means for locking said gooseneck against swinging movement comprising a brace member, means swingably connecting said member to said gooseneck for movement into and out of an operative position, and means on said tractor for coupling said brace member thereto when the same is in its operative position.

18. The structure of claim 3, said means for locking said gooseneck against swinging movement comprising a brace member, means swingably connecting said member to said gooseneck for movement into and out of an operative position, means on said gooseneck engageable with said brace member to lock the same in its inoperative position and means on said tractor for coupling said brace member thereto when said brace member is in the operative position.

19. A coupling adapted for connecting a tractor and a trailer, comprising a gooseneck universally connected to said tractor and having a free end extending rearwardly thereof, complementary coupling means on said trailer and on the free end of said gooseneck, said complementary coupling means being engageable for rigidly connecting said trailer to said gooseneck, said tractor having rear wheels, said means connecting said gooseneck to said tractor comprising a ball on the tractor end of said gooseneck, and a socket carried by said tractor and receiving said ball, said socket being positioned forwardly of said rear wheels and below the axis of rotation thereof.

20. A coupling adapted for connecting a tractor and a trailer, said tractor having rear wheels, said coupling comprising a gooseneck, a universal joint connecting one end of said gooseneck to said tractor forwardly of said rear wheels and below the axis of rotation thereof, and readily detachable complementary coupling means on the free end of said gooseneck and said trailer for rigidly connecting said gooseneck to said trailer.

21. In a coupling adapted for connecting a tractor and a trailer, said tractor having rear wheels, a gooseneck, a universal joint connecting one end of said gooseneck to said tractor forwardly of said rear wheels, means on the free end of said gooseneck for detachably connecting the same to a trailer, and means carried by said tractor for raising and lowering said gooseneck to position and maintain the same at a predetermined height.

22. A coupling adapted for connecting a tractor and trailer, comprising a gooseneck member universally connected to said tractor and having a free end extending rearwardly thereof, said trailer having a vertically swingable and axially extending tongue member, at least one swingable clamp on one of said members, at least one transverse bar on the other of said members and adapted to be engaged by said clamp, flexible means for raising and lowering said gooseneck member and including means adapted to engage said tongue member to maintain the same at a predetermined height.

BERNHARD A. MOSLING.